United States Patent [19]

Hodlewsky et al.

[11] Patent Number: 4,865,183

[45] Date of Patent: Sep. 12, 1989

[54] WIDE CHAIN CONVEYOR SPROCKET DRIVE

[75] Inventors: Wasyly G. Hodlewsky, Greendale; Roger H. Schroeder, Hartland, both of Wis.

[73] Assignee: Rexnord Inc., Brookfield, Wis.

[21] Appl. No.: 114,786

[22] Filed: Oct. 30, 1987

Related U.S. Application Data

[63] Continuation-in-part of Ser. No. 790,706, Oct. 24, 1985, abandoned.

[51] Int. Cl.$^4$ ............................................. B65G 23/06
[52] U.S. Cl. ..................................... 198/834; 198/853
[58] Field of Search ........ 198/832, 834, 835, 850–853, 198/840, 836, 837, 842, 841; 110/330; 432/245, 206; 474/152

[56] References Cited

U.S. PATENT DOCUMENTS

| Re 30,341 | 7/1980 | Lapeyre | 198/853 X |
| 4,438,838 | 3/1984 | Hodlewsky et al. | 198/853 |
| 4,688,670 | 8/1987 | Lapeyre | 198/853 |

FOREIGN PATENT DOCUMENTS

| 0054752 | 6/1982 | European Pat. Off. | 198/834 |
| 0015058 | 10/1889 | United Kingdom . | |
| 0016820 | 10/1905 | United Kingdom . | |

OTHER PUBLICATIONS

Rexnord Manual #831270, Published 1983.
Rexnord Manual #831270-R1 Published 1985 & 1987.
Rexnord Bulletin No. 841290.

Primary Examiner—Robert J. Spar
Assistant Examiner—Lyle K. Kimms
Attorney, Agent, or Firm—Welsh & Katz

[57] ABSTRACT

A sprocket and drive shaft assembly for a wide conveyor belt composed of modules pivotally connected in chain-like fashion and subject to environmentally caused fluctuations in width such as extreme temperatures. The assemlby includes a drive shaft with a polygonal cross section and a plurality of toothed sprockets each having an axial bore which slidingly engages the cross section of the shaft and permits the sprockets to move laterally in response to fluctuations in conveyor width and lateral alignment, as the rotating sprocket assembly drives the conveyor. Restraining devices such as set screws are provided on the drive shaft to prevent the sprockets from undergoing excessive axial movement (toward the ends of the drive shaft) while allowing the sprockets axial freedom to shift in response to lateral belt misalignment and width fluctuation.

15 Claims, 6-Drawing Sheets

WIDE CHAIN CONVEYOR SPROCKET DRIVE

RELATED APPLICATION

This is a continuation-in-part of Ser. No. 790,706, filed Oct. 4, 1985.

BACKGROUND OF THE INVENTION

The present invention relates to wide mat-type conveyors made up of links or modules connected together in chain-like fashion and designed to be driven by a drive shaft and sprocket assembly. More specifically, the present invention is concerned with an improved drive shaft and sprocket assembly which is designed to maintain driving engagement with the belt despite fluctuations in belt width caused by drastic changes in temperature.

In U.S. Pat. No. 4,438,838 and design application Ser. No. 578,341, there is shown and described a chain link conveyor belt formed of a plurality of pivotally interlocking and substantially rectangular modules. Both interlocking ends of each module include a series of spaced link ends having central apertures to permit the insertion of a pivot pin which joins adjacent modules in interlocking fashion. The modules also include a support portion which connects the two sets of link ends of each module and is used for conveying loads. Both the width and the length of the belt may be varied by changing the number and/or the width of modules.

The conveyor link modules can be made of a variety of materials, however, they are preferably made of any one of various types of plastic for reasons of cost efficiency, weight reduction and corrosion resistance. Also, this type of conveyor is commonly used in processing facilities, where products are conveyed from one processing step to another. Often, these processing steps will entail drastic changes in environmental conditions such as temperature and humidity. Fluctuations from room temperature to −50° F., or from room temperature to 212° F. are not uncommon. These extreme variations in the conveying environment are the source of changes in conveyor dimensions due to the expansion and/or contraction of conveyor modules. Consequently, the plastic materials used in the conveyor support and drive apparatus must also be capable of withstanding extreme environmental fluctuations as well as adapting to changes in conveyor belt dimensions.

U.S. Pat. Re No. 30,341 to Lapeyre discloses a conveyor sprocket and drive shaft assembly in which the central sprocket is locked to a drive shaft, while the remaining sprockets are free to move axially in either direction to adapt to fluctuations in chain width.

Although this design theoretically appears to solve the problem of fluctuations in conveyor width, in many applications this arrangement is unsatisfactory. This is due in great part to the fact that the Lapeyre sprocket and drive assembly is "especially designed for use with a chain link conveyor belt of the type described in the aforementioned U.S. Pat. No. 3,870,141 . . . " (Re. No. 30,341, col. 2, lines 29-31).

The conveyor belt disclosed in Lapeyre is formed of modules provided with relatively narrowly spaced elongate members connecting sets of link ends. The link ends of sequential modules are connected in interlocking fashion by an elongate pin to form a conveyor belt as described above. The narrow spaces between adjacent elongate members serve as sprocket tooth pockets for the teeth of the conveyor drive sprockets, allowing each tooth to drivingly engage a link end of the adjacent connected conveyor module. Thus, the teeth of the single locked drive sprocket will engage the belt between the same two elongate members of the centrally-disposed modules with each cyclical rotation of the belt. The two elongate members as well as the sprocket teeth will be subject to wear due to bi-directional, laterally-directed loads caused by expansion and contraction of the belt as well as by uneven belt loading, shaft misalignment and other inaccuracies in conveyor manufacture. The relatively narrow spacing between adjacent elongate members, coupled with the close fit of the sprocket teeth between the members, does not accommodate significant lateral variation of the belt alignment before sprocket/belt meshing problems are encountered. When the conveyor belt is made of plastic, as is the case with the preferred Lapeyre embodiment, the elongate members and particularly the sprocket teeth are particularly subject to failure caused by this combination of wear and lateral misalignment.

In addition, Lapeyre teaches the use of a pair of C-clips to secure the locked drive sprocket to the shaft so as to prevent axial movement thereon. One clip is placed on either side of the sprocket, and the clips retain the sprocket on the shaft by means of grooves cut into the corners of the shaft. It is common engineering knowledge that the cutting of grooves of this type into a shaft will weaken the shaft. Conveyor drive shaft strength is often critical due to the amount of loading experienced by the conveyor belt, and this principle applies to conveyors made of plastic as well as metal.

Lastly, it is more time consuming to assemble and maintain an extra wide conveyor drive when C-clips are used to retain the sprockets, and C-clips are often unavailable for shafts having larger cross sections.

Thus, an object of the present invention is to provide a conveyor chain sprocket drive apparatus which maintains a desirable conveyor/sprocket interface despite fluctuations in lateral conveyor alignment caused by extreme temperature variations, wear, side loads etc.

It is another object of the present invention to provide a conveyor chain sprocket drive apparatus which is compatible with the type of stress loading and width fluctuations encountered by wide conveyor mats formed of several modular links connected at the sides.

It is a still further object of the present invention to provide a conveyor chain sprocket drive apparatus which includes a sprocket retention means which does not weaken the drive shaft, yet is sanitary and cost effective.

SUMMARY OF THE INVENTION

The present invention discloses a sprocket and drive shaft assembly for a wide conveyor belt composed of modules or links pivotally connected in chain-like fashion and subject to fluctuations in width due to extreme environmental conditions. The assembly comprises a rigid drive shaft having a uniform, polygonal cross section, upon which is mounted a plurality of toothed sprockets. Each of the sprockets is fabricated with a hub having an axial bore which correspnds to the cross section of the drive shaft and which affords the sprockets the ability to float or to slide axially on the shaft.

The sprockets are restrained against more than a predetermined amount of axial movement on float or the drive shaft by restraining means or stop members such as set screws or set collars. The stop members may be positioned on the ends of the shaft to coact with the outer hub faces of the two outermost sprockets. The stop member alternatively may be positioned adjacent a pair of sprockets which are located closer to the center of the shaft. Axial movement of the remaining drive sprocket (those which do not engage the stop members) is not restricted other than by engagement with the conveyor belt. As the belt expands, all of the sprockets are free to move laterally on the shaft to accommodate the expansion, thus maintaining their engagement with the belt. Belt tracking is maintained between spaced lateral limits by the coaction of the sprockets with the stop members, which prevent the belt and sprockets from moving more than a certain amount side-to-side. In addition, the conveyor belt is preferably provided with sprocket tooth pockets having a lateral dimension which increases the freedom of the sprockets to move axially on the shaft.

Alternatively, the stop members may be removed and replaced by conveyor guides located along the side of the conveyor belt in spaced relationship thereto to accommodate belt expansion. Thus, without stop members attached to the shaft, all sprockets are capable of axial movement limited only by their engagement with the conveyor belt.

Thus, the sprocket and drive shaft assembly of the present invention is capable of maintaining driving engagement with wide span, mat-like conveyors, despite fluctuations in width and lateral belt misalignment. The present invention is also compatible with conveyors which are widened by connecting similar modules in side-to-side fashion.

DESCRIPTION OF THE DRAWINGS

The invention and its many attendant objects and advantages will be better understood by reference to the following drawings, wherein.

DESCRIPTION OF THE PREFERRED EMBODIMENT

Figure 1:
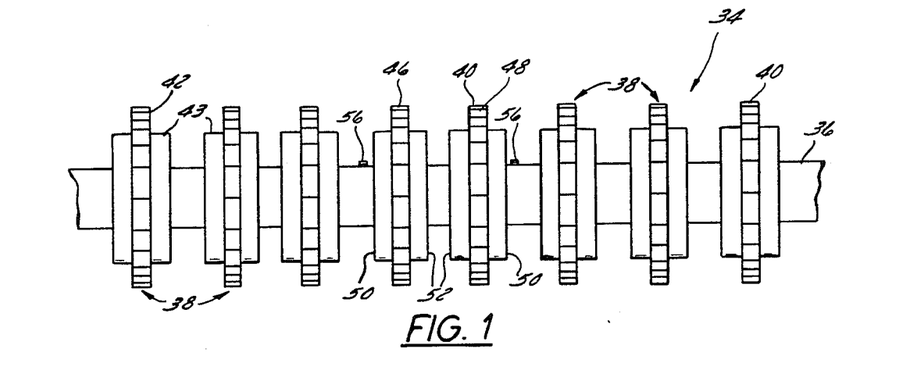
FIG. 1 is an elevational view of a conveyor drive shaft and sprocket assembly according to one embodiment of the invention.

Referring to the drawings, wherein like references characters indicate identical or corresponding parts, FIG. 1 illustrates a sprocket and drive shaft assembly designed for use with a chain link conveyor belt of the general type described in the aforementioned design patent application Ser. No. 578,341 and illustrated for purposes of explanation in FIGS. 4–6 of the drawings.

Figure 4:
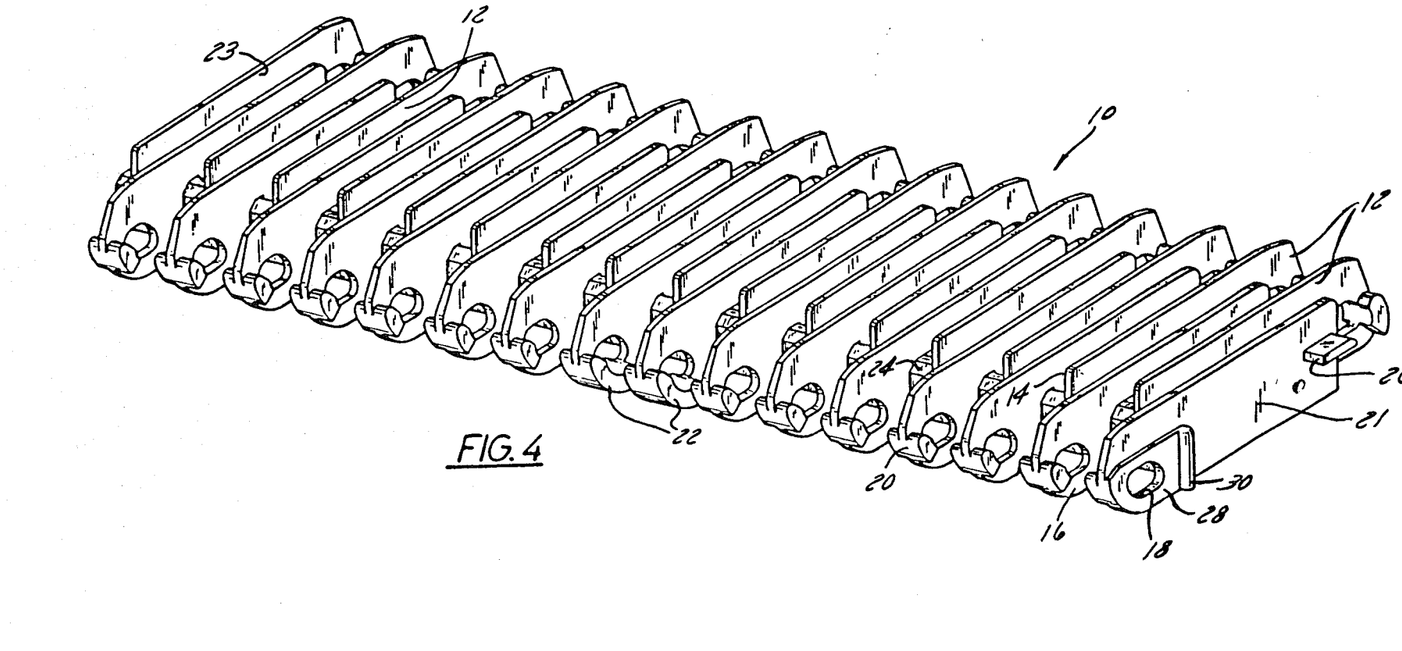
FIG. 4 is a perspective view of a type of conveyor link to be used with the present invention.
Figure 5:
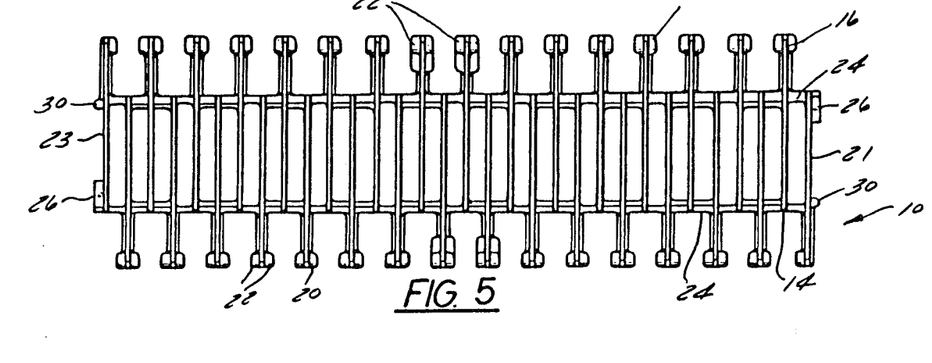
FIG. 5 is an plan view of the type of conveyor link shown in FIG. 4.
Figure 6:
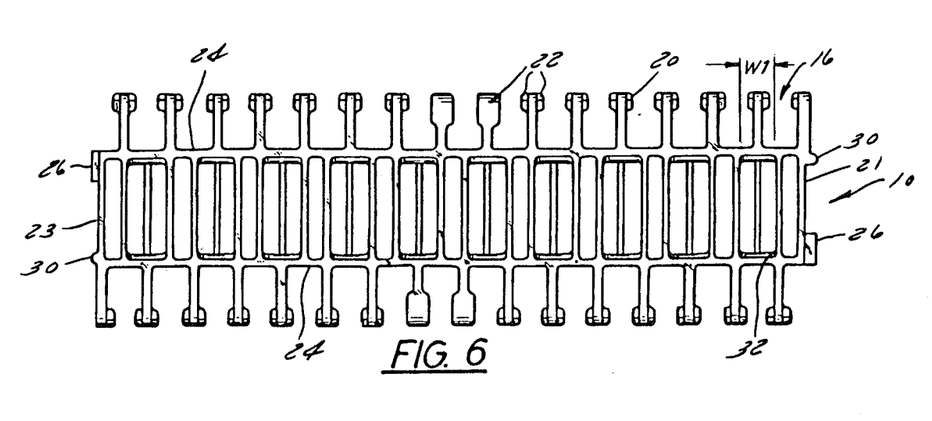
FIG. 6 is a bottom plan view of the conveyor link shown in FIG. 4.

Referring now to FIGS. 4–6, one form of conveyor belt designed to be used in conjunction with the present invention is provided with a multiplicity of similar links or modules generally designated 10, pivotally connected end-to-end. Each module 10 is designed to be formed as an integral unit, preferably of a polymeric plastic material, by a conventional molding process. Plastic materials having the following characteristics are preferred: strength combined with light weight, wear and impact resistance, compatibility with a variety of atmospheres, resistance to damage resulting from changes in ambient conditions such as temperature, humidity, etc., ease of cleaning and low cost of replacement. Examples of suitable materials are: acetals, nylons, polyethylene, polyesters and polypropylene.

As shown, each module 10 is provided with a plurality of generally parallel, laterally flattened members 12 each having a vertically truncated end 14 and a rounded end 16 provided with an elongated aperture 18. The rounded end 16 of each connecting member 12 is provided with axially extending spacing members 20.

The connecting members 12 are arranged so that each member is oriented in a reversed position with respect to the adjacent members 12 on either side. Thus, except for the end members 21 and 23, every truncated end 14 is flanked by two rounded ends 16, and every rounded end 16 is flanked by two truncated ends 14. Also the two end members 21 and 23 are oriented in reverse position to each other.

To enable the connecting members 12 of each module 10 to be formed into conveyor belts, the members are slightly offset so that apertures 18 of rounded ends 16 are not blocked by flanking truncated ends 14, whereupon a pivot pin (not shown) may pivotally connect adjacent and interlocking modules 10 by passing through the plurality of adjacent and interlockingly aligned apertures 18. The connecting members 12 of each module 10 are held in spaced-apart alignment by a pair of axially extending support beams 24.

Laterally abutting modules are held in spaced alignment by stabilizing lugs 26 adjacent to truncated end 14 and laterally projecting vertical flange 30 adjacent the rounded end 16 of each end member 21 and 23. Since end members 21 and 23 are arranged in reversed orientation to each other, when laterally adjacent modules 10 contact each other, lug 26 of one module abuts flange 30 of the adjacent module. Similarly, flange 30 of the first module abuts lug 26 of the adjacent module to maintain a designated spatial relationship between adjacent modules.

Once the adjacent members 12 are joined in a coupled fashion to form a conveyor belt, the members are held in lateral alignment by spacing members 22, which sandwich interlocking members 12 to prevent belt deformation caused by laterally-applied assembly forces.

In the preferred embodiment, the central members 12 of each module 10 are provided with spacing members 20 which provide additional resistance to belt deformation by adding additional pivot pin support.

Referring now to FIG. 6, the underside of each module 10 shows that a portion of every third connecting member 12 has been removed to form sprocket tooth pockets 32. Once modules 10 are formed into interlocking relationship into mat-like conveyor belts, it is these tooth pockets 32 which will be engaged by the drive sprocket assembly of the present invention to propel the belt.

Figure 2:
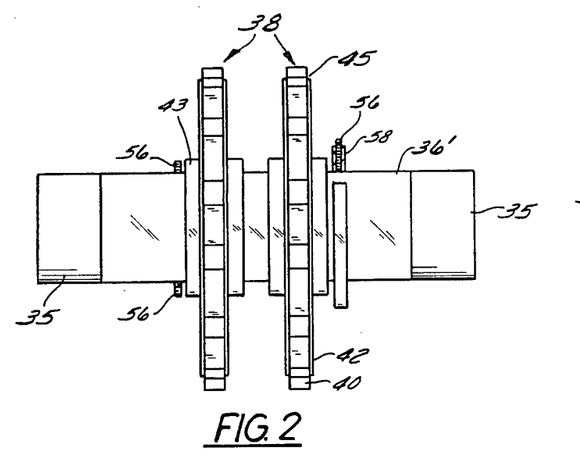
FIG. 2 is an elevational view illustrating a sprocket and shaft assembly of the invention employing two sprockets, a square drive shaft with circular end portions and stop members located near the ends of the shaft.
Figure 3:
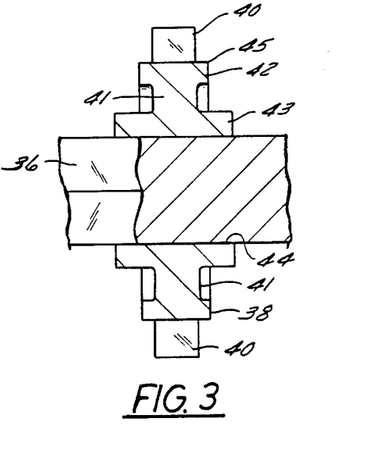
FIG. 3 is a sectional view of a sprocket similar to the one shown in FIG. 2.

Referring now to FIGS. 1-3, the drive shaft assembly 34 includes drive shaft 36 which is of polygonal cross-section. Drive shaft 36 may be provided with a hexagonal or square cross-section to conform to conveyor industry specifications. Metals such as steel are preferred for strength. Combinations of materials may be employed to advantage. As shown in FIGS. 2 and 3, a cylindrical steel shaft 35, either solid or hollow, may be provided with a sleeve 36' having a square or hexagonal external configuration, formed of aluminum or other material selected because of its lightness, ease of fabrication, e.g. adaptability to molding or extrusion, and/or its resistance to damage by the environment in which it is designed to operate. Sleeve 36' is keyed or pinned to shaft 35 so that a driving connection is established between the sleeve and the shaft.

In most instances, drive shafts will be stainless steel or carbon steel. Both of these materials are resistant to wear resulting from axial motion of the sprockets. However, the latter, when formed of plastics, have a low coefficient of friction, thus resulting in ease of axial motion as well as reducing or eliminating drive shaft wear. For particular applications, it may be desirable to form the drive shaft sleeve 36' entirely of a relatively inert material such as stainless steel or a polymeric plastic which is similar to, but not the same as, that used for belt links and/or sprockets.

Figure 2A:
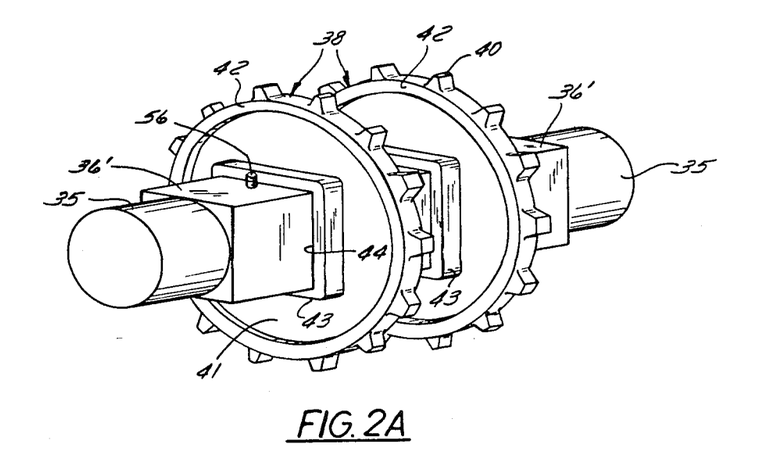
FIG. 2a is a perspective view of the sprocket assembly of FIG. 2.

Upon drive shaft 36 or sleeve 36' are arranged a plurality of sprockets 38, the number of which is determined by the width of the belt, although a minimum of two sprockets (FIGS. 2 and 2A) is usually required. For best results, it is desirable to have one sprocket 38 for every 3 to 6 inches of chain width. The sprockets 38 are fabricated of polymeric materials, preferably plastics having the qualities of temperature resistance, acid resistance and low deformability, etc. as are desired in the module 10. Sprockets are also fabricated by conventional moduling means. Suggested materials are acetal, various nylons and polypropylene.

Each sprocket is provided with a plurality of teeth 40 constructed and arranged to drivingly engage the forward wall of the mating tooth pocket 32 of modules 10. Teeth 40 are integrally joined to the outer peripheral rim 42 of sprocket 38. Sprocket rim 42 may have chain support shoulders 45 laterally extending from each side of sprocket 38 in a peripheral orientation.

Each sprocket 38 is further provided with a hub 43 having an axial bore 44 constructed and arranged to slidingly engage shaft 36 or sleeve 36', while preventing rotational motion of the shaft relative to the sprocket. Hubs 43 are relatively long axially to provide for maximum driving engagement surface area for contacting the shaft 36 or sleeve 36'. The hub 43 is connected to the teeth 40 by a flange or web portion 41 which is relatively thin (axially) and supports the rim 42 and shoulders 45. Rim 42 and shoulders 45 are relatively wide in order to provide support for the adjacent end sections of at least two pivotally connected conveyor modules 10.

A recurring problem occasioned by the use of polymeric conveyor components in many processes is that if the axial sprocket bore 44 is to small, the sprocket will not slide on the shaft to compensate for the expansion of the belt. Also, the sprocket 38 may "freeze" on shaft 36 due to differential coefficients of expansion and contraction of shaft and sprocket materials.

In the present apparatus, axial bore clearance is preferably found within the approximate range of 0.006"to 0.060". This amount of clearance has been found to provide adequate lateral slidability without producing any loss of belt tracking.

For purposes of explanation, the sprockets will be described as having an outboard side 50 and an inboard side 52 (FIG. 1). To maintain belt tracking while allowing for belt expansion and contraction, restraining means or stop members 56 are provided to contain the axial movement of the sprockets between predetermined limits. In FIG. 1, a pair of set screws 56 are positioned adjacent to the outboard sides 50 of the two sprockets nearest the center of the shaft. When the sprockets are aligned with the centers of the tooth pockets 32 (FIG. 6) with which they engage, the distance between each set screw 56 and the outboard side 50 of the adjacent sprocket is on the order of 1/16 inch or more. The set screws 56 operate as stop members to limit the axial movement of the sprockets.

As mentioned, the sprocket stop members may include a pair of set screws 56 tapped directly into shaft 36. If desired, a plurality of set screws may be situated at spaced intervals around shaft 36, those suggested intervals being 180°, 90°, etc. FIG. 2 shows two set screws (on the left) spaced 180° apart on a square sleeve 36' of shaft 35. Alternately, a set collar 58 having a set screw 56' may be substituted for the tapping of set screw 56' directly into sleeve 36'. This is shown in FIG. 2 on the right. It is preferred that the set screws 56' be equidistant from the center of the shaft 36.

It has been found that the most effective compromise between the need to maintain belt tracking and the often conflicting requirement of adaptability to variations in belt width and alignment due to fluctuations in temperature, misalignment of parts, etc. is to permit all the sprockets to have at least a limited degree of float or axial movement. This degree of movement is achieved in the embodiment of FIGS. 1, 2, 11 and 12 by locating the restraining set screws 56 a designated clearance distance from the outboard side 50 of the adjacent sprockets 38. This distance is designed to permit substantial fluctuations in belt width due to expansion and contraction while tracking the belt within reasonable side-to-side limits. In each application, the placement of limit devices 56/56' on shaft 36 will be determined on the basis of the amount of lateral movement caused by that particular working environment. In practice, the clearance between each set screw 56/56' and the outboard face of the adjacent sprocket hub 43 ranges from approximately 1/16 to 7/32 inch, with a preferred clearance of 5/32 inch, assuming the sprocket 38 is positioned in alignment with the center of the mating tooth pocket in the conveyor belt. With this interval, maximum belt expansion is accommodated in a greater variety of applications while maintaining proper belt tracking.

Figure 11:
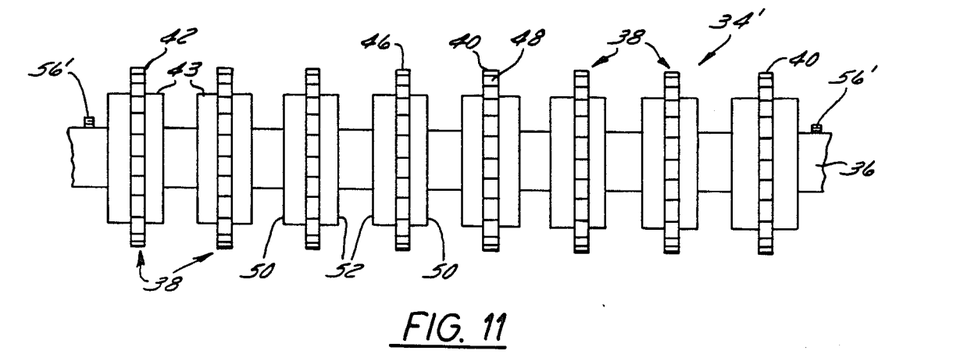
FIG. 11 is an elevational view of an alternate embodiment of the conveyor drive shaft and sprocket assembly of FIG. 1.
Figure 12:
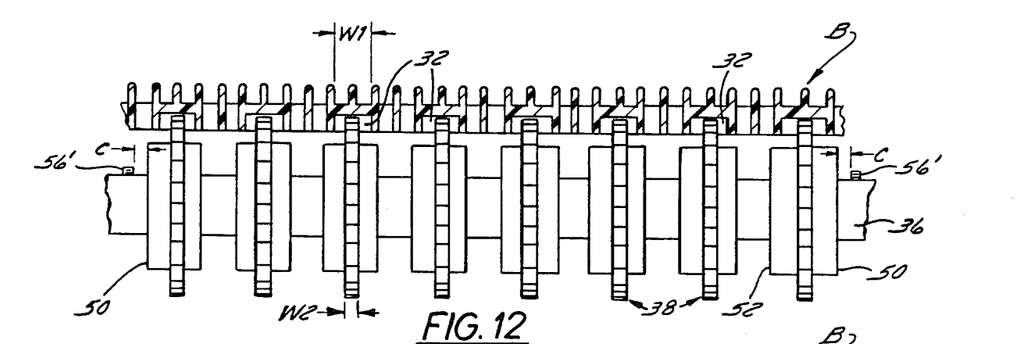
FIG. 12 is an elevational view of the embodiment of FIG. 11, showing how the conveyor belt coacts with the sprocket drive teeth.

FIG. 12 shows the arrangement of FIG. 11 with a cross-sectional representation of the conveyor belt B positioned in engagement with the sprockets. It should be noted that each sprocket is centered with respect to the mating sprocket pocket 32. It should also be noted that the width W1 of each sprocket pocket 32 (also see FIG. 6) is greater than the width W2 of the mating sprocket tooth. In practice, W1 may exceed W2 by from $\frac{1}{8}$ to $\frac{1}{4}$ inch.

The clearance between each set screw 56' and the outboard side 50 of the adjacent sprocket is designated C (FIG. 12). Any of the inner sprockets is movable axially by an amount which is equal to $2(W1-W2+C)$. This is due to the fact that the sprocket 38 is initially movable axially to the point where it contacts an edge of its mating sprocket pocket 32. Further axial movement of the sprocket moves the whole belt laterally until the endmost sprocket is moved into contact with the adjacent set screw 56'. Thus considering both the belt and the set screws as mechanisms which restrain axial motion of the sprockets, none of the sprockets is axially "locked" and all of the sprockets have approximately the same degree of axial freedom, i.e., under constant temperature conditions the inner sprockets are free to float or move axially by an amount equal to $2(W1-W2+C)$ while the endmost sprockets are free to move axially by an amount equal to $W1-W2+2C$.

A further advantage of the present invention is that the set screws 56/56' are readily removable to permit replacement of sprockets or the changing of conveyor belts or modules within the belts. In the case of the FIG. 12 arrangement, only one screw needs to be removed to permit the removal of all sprockets 38 from the same end of the shaft.

Figure 13:
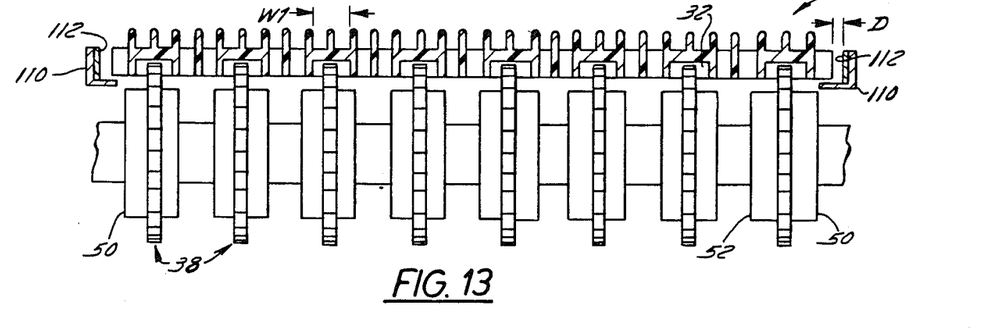
FIG. 13 is an elevational view of the alternate embodiment of the conveyor drive shaft and sprocket assembly of FIG. 12 wherein the stop members have been removed and replaced by a pair of conveyor guides.

Referring now to FIG. 13, an alternate type of sprocket stop means is disclosed. The set screws 56' have been removed to allow all sprockets 38 an amount of axial movement limited only by their engagement with the belt. However, structure should be provided to maintain belt tracking. In this embodiment, a conveyor guide 110 is secured to a conveyor frame (not shown) by conventional means. The guide 110 may be an elongate section of flat bar stock or angle iron and may be provided with a low-friction belt engaging surface 112 to minimize conveyor belt wear. The guide 110 is mounted a distance D from conveyor belt B to accommodate maximum belt expansion, depending on the application, and accounting for deviations in belt manufacture. For example, at 200° F., a 10 foot wide belt will expand approximately to $\frac{3}{4}$ inch or approximately $\frac{3}{8}$ inch per side. Thus, adequate clearance should be provided to accommodate belt expansion while maintaining belt tracking.

Figure 7:
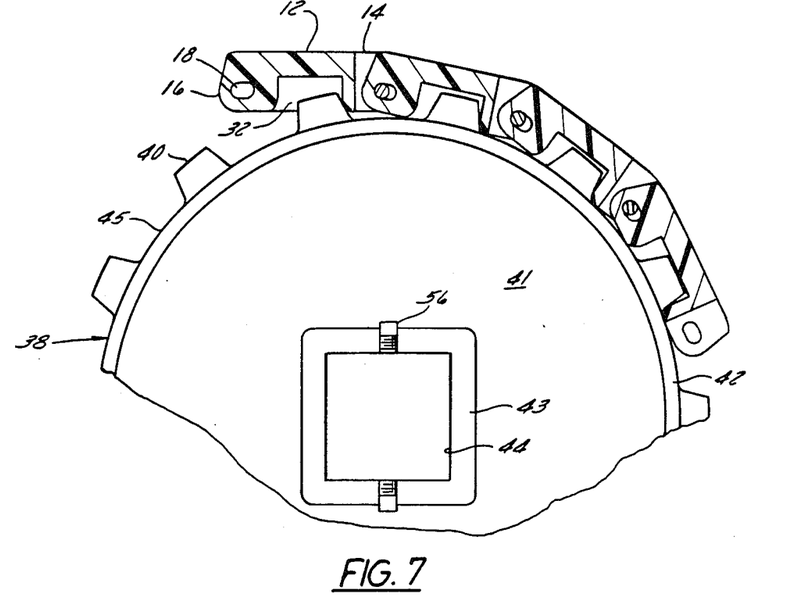
FIG. 7 is a side elevational view in partial section of a sprocket engaging a section of conveyor chain.
Figure 8:
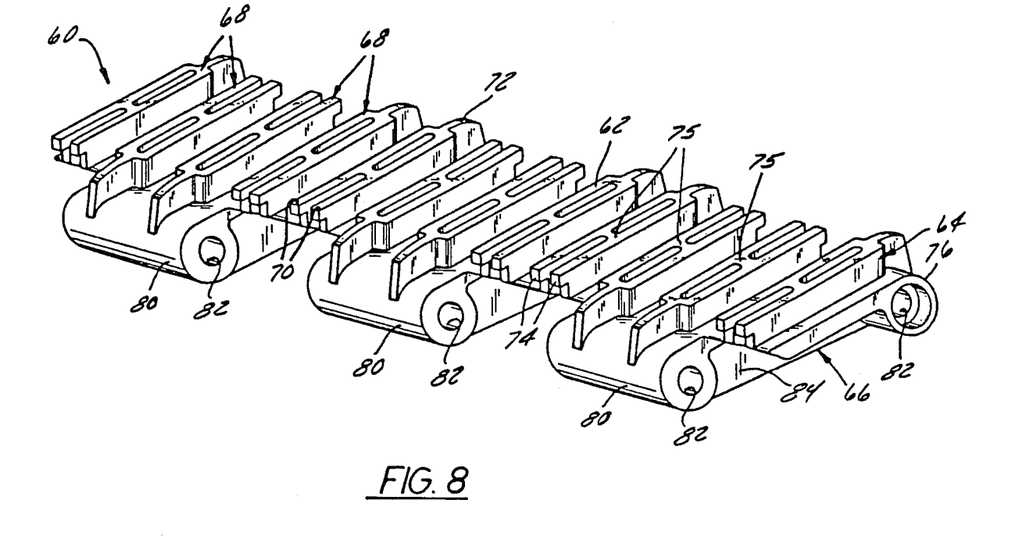
FIG. 8 is a perspective view of an alternate type of conveyor link which may be used with the present invention.

FIG. 8 is a perspective view of a link or module 60 of an alternate form of conveyor chain compatible with the present invention. FIG. 8 shows the top surface 62 of link 60. Link 60 includes a raised portion 64 and a base portion 66. Link 60 is made of a molded polymeric material, and raised portion 64 and base portion 66 are integral parts of the molded link 60. Raised portion 64 is made up of several coplanar fork-shaped members 68 which are arranged in a regularly spaced row supported by base portion 66. Each fork-shaped member 68 includes two prongs 70 and a stem 72. The prongs 70 of each fork-shaped member 68 are parallel to each other, and the width of stem 72 is less than the distance between prongs 70 such that the stem 72 of a fork-shaped member 68 on one link 60 will fit between the legs 70 of the adjacent fork-shaped member 68 on the adjacent link 60 when two links are interconnected end-to-end. The top surface of each stem 72 is curved so as to provide a smooth top surface 62 when links 60 curve around a sprocket as shown in FIG. 7. The ends 74 of prongs 70 are cut away at the bottom in order to permit back-flexing of interconnected links. The stems 72 blend into and are supported on the barrels 76, 80 and the ends of the stems 72 lie in a plane which is tangential to the outermost edge of the barrels 76, 80. Cross-members 75 are provided with each fork-shaped member 68, extending between and connecting prongs 70 approximately at their midpoints to give added strength to link 60.

Figure 9:
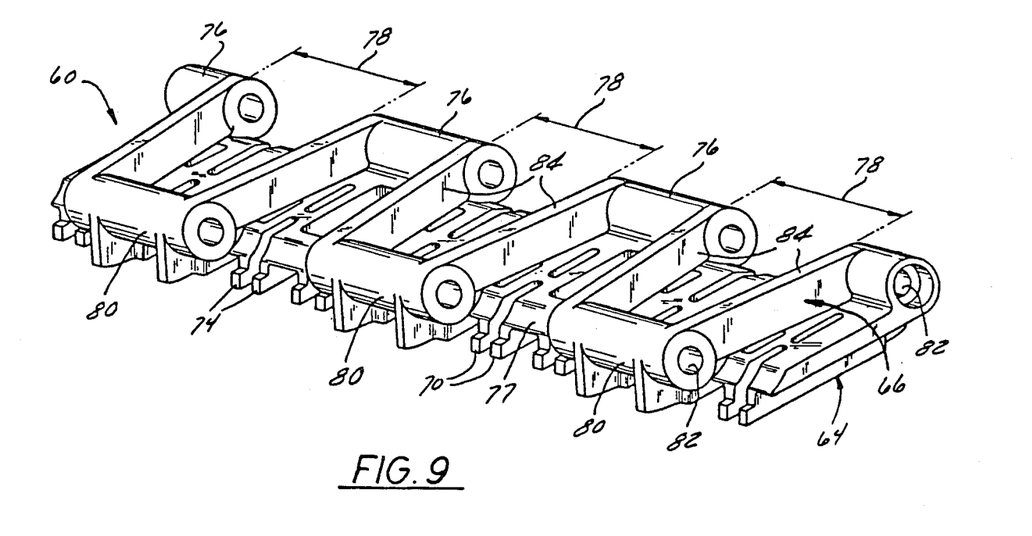
FIG. 9 is a perspective view of the bottom of the link shown in FIG. 8.

FIG. 9 is a perspective view of the bottom side of link 60 shown in FIG. 8 and gives a better view of base portion 66. First hollow barrels 76 are axially aligned, with spaces 78 between barrels 76. Second hollow barrels 80 are axially aligned, and the axis of barrels 80 is parallel to the axis of barrels 76 such that barrels 80 are positioned opposite spaces 78. All barrels 76 and 80 have apertures 82 through them to permit the insertion of a pin (not shown), and the outermost barrels 76 have apertures 82 which are recessed so that the heads of the pins which connect the links may be recessed. It should be noted that the outermost barrels 76 are in line with the edge of the raised portion 64, so that the link provides smooth, straight sides for smooth interaction with the conveyor frame. Reach bars 84 interconnect barrels 76 and 80 and serve to strengthen link 60. Reach bars 84 also assist in tracking the chain by preventing excessive lateral movement over the sprockets. Each reach bar 84 has one end attached to a barrel 76 and the other end attached to a barrel 80. Arcs 77 are provided for close hinge design without hinge interference and to avoid trapping of material.

Figure 10:
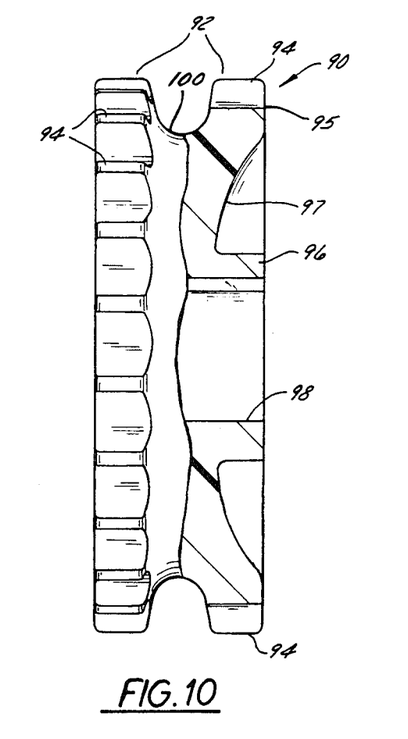
FIG. 10 is an elevational view in partial section of a sprocket designed to drive the conveyor link shown in FIG. 8.

Referring now to FIG. 10, a sprocket 90 for driving a conveyor chain made up of modules 60 is shown including a pair of rows 92 each having a plurality of teeth 94 constructed and arranged to drivingly engage barrels 76 and 80 of module 60. Teeth 94 are integrally joined to the outer peripheral rim 95 of sprocket 90. Each sprocket 90 is further provided with a hub 96 having an axial bore 98 constructed and arranged to slidingly engage shaft 36, while preventing rotational motion of the shaft relative to the sprocket. Hubs 96 are relatively long axially to provide for maximum driving engagement surface area for contacting the shaft 36. The hub 96 is connected to the teeth 94 by a flange or web portion 97 which is relatively thin axially and supports the chain rim 94. Sprocket 90 differs from sprocket 38 in that sprocket 90 is equipped with two rows 92 of teeth 94 which are separated by recessed area 100 which is designed to be wide enough to accommodate the angular orientation of reach bar 84 (shown in FIG. 9). Sprocket 90 has traditionally been keyed or fixed to the drive shaft. However, in accordance with the present invention, sprocket 90 may be positioned upon a shaft 36 and restrained thereon by set screws 56/56' or other restraining means as are sprockets 38. The axial hub bore 98 would be modified accordingly to permit axial movement upon the shaft 36.

Thus, the present invention provides a conveyor sprocket and drive shaft assembly comprising a plurality of axially slidable drive sprockets mounted on a rigid shaft with axial restraining devices provided near the ends of the shaft such that when a conveyor belt is engaged with the sprockets, all of the sprockets are allowed to move axially approximately the same amount, whereupon the belt is tracked between controlled lateral limits while being permitted to expand and contract crosswise to accommodate environmentally induced width fluctuations. The conveyor belt is also provided with tooth pockets dimensioned to permit sprockets drivingly engaged therewith the freedom to move axially on the shaft.

While particular embodiments of the conveyor sprocket and drive shaft assembly have been shown and described, it will be obvious to persons skilled in the art that changes and modifications might be made without departing from the invention in its broader aspects.

What is claimed is:

1. A conveyor assembly comprising:
   a drive shaft having two opposed ends;
   a plurality of at least eight toothed sprockets mounted in driven engagement on said shaft, all of said sprockets being supported so as to slidably float on said shaft in either axial direction;
   a conveyor belt engaging said toothed sprockets, said conveyor belt being subjected to conditions which cause its width to change; and
   means for loosely restraining all of said sprockets on said shaft, said means including limit devices positioned to bracket all of said sprockets so that two sprockets of said group, each of said two sprockets being located nearest the respective end of said shaft is axially and outwardly restricted by said limit devices, with the remainder of said group of sprockets being axially restrained only by engagement with said belt, whereupon all of said sprockets float axially on said shaft and said belt is permitted to fluctuate in width while being confined within a path of movement laterally restricted by said limit devices.

2. The assembly described in claim 1 wherein said limit devices include a pair of stop members mounted on said shaft so as to cooperate with the two sprockets nearest the ends of said drive shaft to limit the axial movement of said sprockets.

3. The assembly described in claims 2 wherein said stop members comprise a pair of set screws threadably mounted on said drive shaft.

4. The assembly described in claims 2 wherein said limit devices comprise a pair of set collars.

5. A drive sprocket and shaft assembly for use with a conveyor belt subject to fluctuations in width comprising:
   a drive shaft with a polygonal cross section and having two ends;
   a plurality of at least eight toothed sprockets mounted in driven engagement on said shaft, each of said sprockets engaging the conveyor belt and being supported so as to slidably float on said shaft in either axial direction; and
   a pair of stop members mounted on said drive shaft in positions spaced from the center of said shaft, one said stop member located near each of said shaft ends so that all of said sprockets are included between said stop members and float axially on said shaft between said stop members by a distance at least as great as the width of the teeth on said sprockets.

6. The assembly described in claim 5 wherein said stop members are positioned equidistant from the center of said drive shaft.

7. The assembly described in claim 5 wherein said stop members comprise a pair of set screws threadably mounted on said drive shaft.

8. A conveyor assembly comprising:
   a drive shaft having two ends;
   a plurality of toothed sprockets mounted in driven engagement on said shaft, all of said sprockets being supported so as to slidably float on said shaft in either axial direction;
   a conveyor belt engaging said toothed sprockets, said conveyor belt being subjected to conditions which cause its width to change; and
   means for restraining said sprockets from excessive axial movement on said shaft, said means including a limit device located in outwardly spaced relationship from said sprocket located nearest each said end of said shaft to permit axial floating movement of all of said sprockets, all of said sprockets being included between the limit devices, said floating movement being axially limited by the restraining action of said limit devices and said belt on said sprockets and being sufficient to accommodate the width changes of said conveyor belt.

9. The assembly described in claim 8 wherein said limit devices comprise a pair of set screws threadably mounted on said drive shaft.

10. The assembly described in claim 8 wherein said limit devices comprise a pair of set collars.

11. The assembly described in claim 8 wherein said stop members comprise a conveyor guide located in spaced relationship to each of said sprockets located nearest the ends of said shaft.

12. A drive sprocket and shaft assembly for use with a conveyor belt subject to fluctuations in width comprising:
    a drive shaft with a polygonal cross section;
    a plurality of at least eight toothed sprockets mounted in driven engagement on said shaft, each of said sprockets engaging said conveyor belt and being supported so as to slidably float on said shaft in either axial direction; and
    a pair of stop members, one mounted near each end of said drive shaft so that all of said sprockets are included between said stop members and float axially on said shaft by a distance at least as great as the width of the teeth on said sprockets, the outermost of said sprockets being axially limited by said stop members and the sprockets inboard of said outer sprockets being axially limited only by engagement with said conveyor belt.

13. The assembly described in claim 12 wherein said stop members are positioned equidistant from the center of said drive shaft.

14. The assembly described in claim 12 wherein said stop members comprise a pair of set screws threadably mounted on said drive shaft.

15. The assembly described in claim 12 wherein said belt is provided with a plurality of sprocket tooth pockets drivingly engaged by said sprocket teeth, said tooth pockets dimensioned to permit lateral axial movement of said sprocket on said shaft while maintaining engagement with said sprocket teeth.

* * * * *